(12) United States Patent
Barnes et al.

(10) Patent No.: US 8,256,957 B1
(45) Date of Patent: Sep. 4, 2012

(54) BI-DIRECTIONAL MOBILE RADIOGRAPHIC IMAGE RECEPTOR ASSEMBLY AND USE THEREOF

(75) Inventors: Gary T. Barnes, Birmingham, AL (US); David M. Gauntt, Birmingham, AL (US); Roger J. Malcolm, San Clemente, CA (US)

(73) Assignee: X-Ray Imaging Innovations, LLC, Birmingham, AL (US)

( * ) Notice: Subject to any disclaimer, the term of this patent is extended or adjusted under 35 U.S.C. 154(b) by 0 days.

(21) Appl. No.: 12/569,249

(22) Filed: Sep. 29, 2009

(51) Int. Cl.
*G21K 1/00* (2006.01)
*H05G 1/64* (2006.01)
*H01J 31/49* (2006.01)

(52) U.S. Cl. .................. 378/189; 378/154; 378/98.8

(58) Field of Classification Search .............. 378/19, 378/98.8, 189, 186, 37, 41, 42, 137, 170, 378/154, 155
See application file for complete search history.

(56) References Cited

U.S. PATENT DOCUMENTS

| | | | | |
|---|---|---|---|---|
| 5,773,839 A | * | 6/1998 | Krepel et al. | 250/580 |
| D397,795 S | * | 9/1998 | Roddy | D24/161 |
| 5,943,390 A | * | 8/1999 | Wendlandt et al. | 378/189 |
| 6,402,459 B1 | * | 6/2002 | Pauli et al. | 415/3.1 |
| 6,702,459 B2 | * | 3/2004 | Barnes et al. | 378/197 |
| 6,893,156 B2 | * | 5/2005 | Sharpensteen et al. | 378/177 |
| 7,545,914 B2 | * | 6/2009 | Kito et al. | 378/98.8 |
| 7,775,712 B1 | * | 8/2010 | Thieman | 378/189 |
| 7,873,145 B2 | * | 1/2011 | Liu et al. | 378/98.8 |
| 2002/0090055 A1 | * | 7/2002 | Zur et al. | 378/154 |
| 2003/0031296 A1 | * | 2/2003 | Hoheisel | 378/98.8 |
| 2006/0182227 A1 | * | 8/2006 | Bernhardt | 378/203 |

* cited by examiner

*Primary Examiner* — Irakli Kiknadze
(74) *Attorney, Agent, or Firm* — Bradley Arant Soult Cummings LLP

(57) ABSTRACT

The present disclosure provides a bi-directional image receptor assembly capable of receiving an image receptor in either a lengthways (or longitudinal) or crossways (or transverse) orientation, while maintaining the axis of an anti-scatter grid in a fixed position. The axis of the anti-scatter grid can be placed in a fixed orientation (such as a parallel orientation) to a subject's craniocaudal axis regardless of whether the image receptor is inserted in the lengthways or crossways orientation. Methods of using the bi-directional image receptor assembly in mobile radiography are also disclosed. The present disclosure further provides for an X-ray image receptor comprising a portion of an automatic position measurement system. Still further, the present disclosure provides for a cover comprising a reinforcing geometry that maximizes the strength of the cover while minimizing the thickness of the cover.

28 Claims, 12 Drawing Sheets

FIG. 8A
FIG. 8B
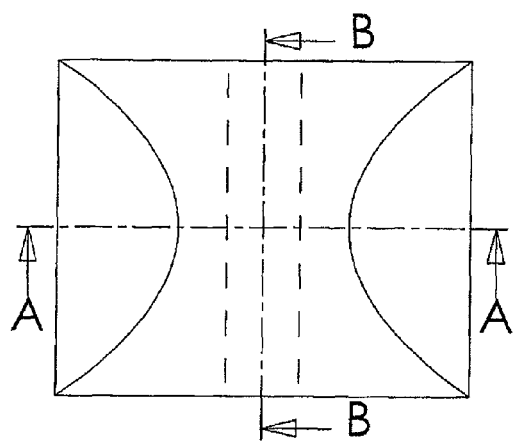
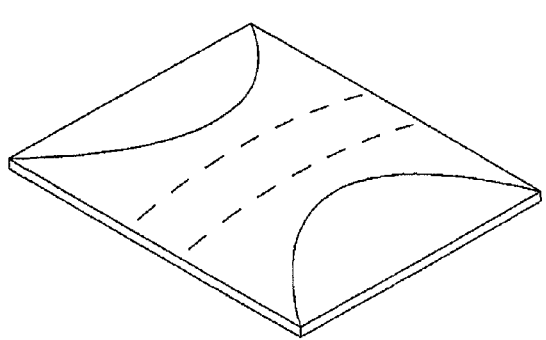
FIG. 8C
FIG. 8D
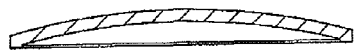
SECTION A-A
SECTION B-B FIG. 9A
FIG. 9B
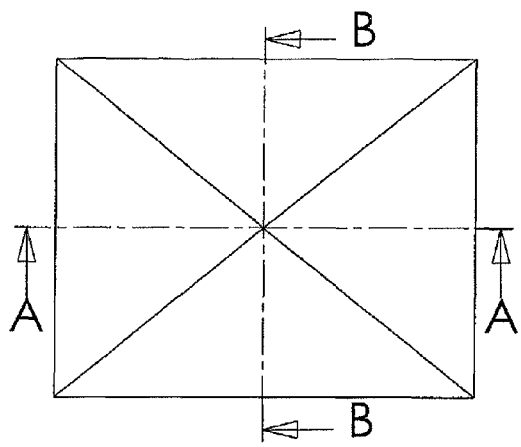
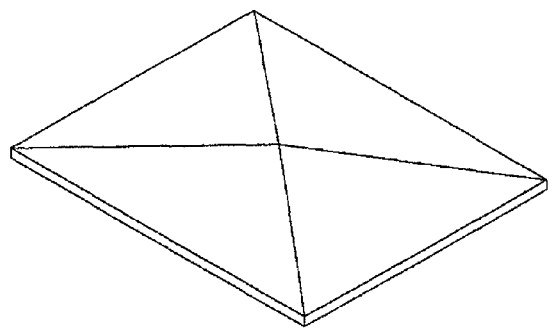
FIG. 9C
FIG. 9D
SECTION A-A
SECTION B-B FIG. 10A
FIG. 10B
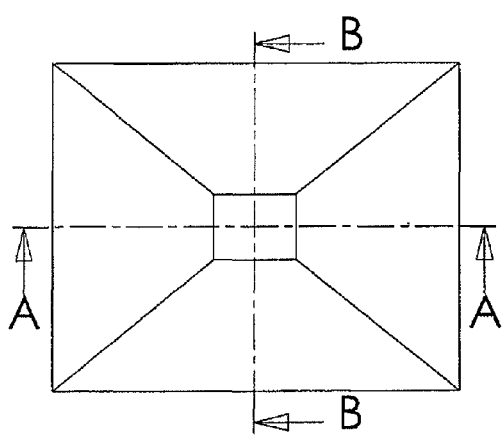
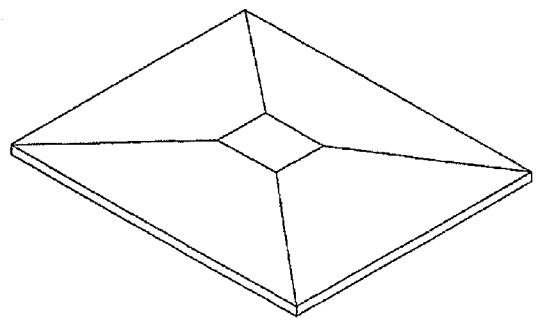
FIG. 10C
FIG. 10D
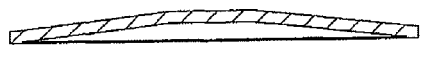
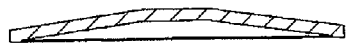
SECTION A-A
SECTION B-B FIG. 11A
FIG. 11B
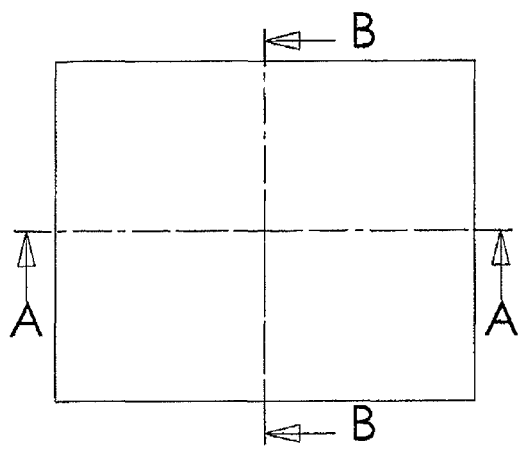
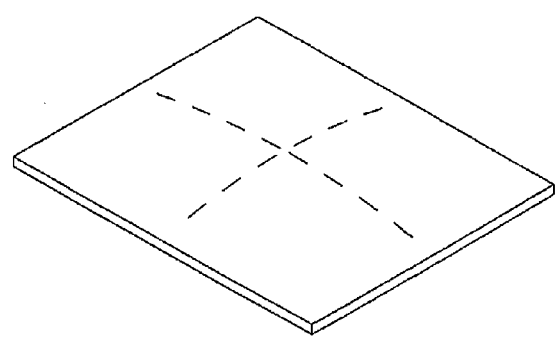
FIG. 11C
FIG. 11D
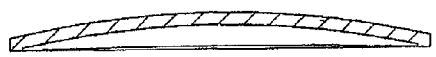
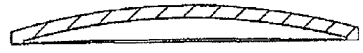
SECTION A-A
SECTION B-B

SECTION A-A

SECTION B-B

BI-DIRECTIONAL MOBILE RADIOGRAPHIC IMAGE RECEPTOR ASSEMBLY AND USE THEREOF

FIELD OF THE DISCLOSURE

The present disclosure relates generally to X-ray imaging and more specifically to an image receptor assembly for accepting an image receptor in mobile radiography.

BACKGROUND

Transmission X-ray imaging involves a point source (sometimes referred to as a focus or X-ray focus) of X-rays, a collimator to limit the X-rays to the region of interest and an image receptor to detect the X-rays. When the X-rays pass through an object, X-ray attenuation differences due to structures in the object give rise to differences in transmitted X-ray intensity. These intensity differences are in turn detected by an image receptor giving rise to the detected X-ray image.

The detected X-ray image is composed of two parts. The primary image consists of detected X-rays that have traveled on a straight-line path from the source to the image receptor. The secondary image consists of detected X-rays that have interacted with atoms and electrons in the object and were deflected or scattered from their original path (scattered X-rays). These scattered X-rays fox in a diffuse, out-of-focus image that is superimposed on the primary image. X-ray image contrast is reduced by scattered X-rays with the problem becoming more acute as the thickness and density of the object being imaged increases.

The image receptor, as discussed above, detects the X-ray image. In many cases, the image receptor is a screen/film cassette. The image receptor may also be a computed radiography cassette, a digital flat panel or other devices known in the art. Although the dimensions of such image receptors can vary, the most common cassettes have the following dimensions: 35 cm×43 cm, 30 cm×35 cm, 24 cm×30 cm or 18 cm×24 cm. Common dimensions for digital flat panel image receptors are 43 cm×43 cm and 35 cm×43 cm.

To obtain an X-ray image on the image receptor, the subject is placed between the X-ray focus and the image receptor. For ambulatory or mobile patients, X-ray images are obtained using stationary X-ray systems. In such cases, it is necessary to transport the subject to the stationary apparatus. However, for very sick or otherwise hard to move patients it is often necessary to bring the X-ray apparatus to the subject. In such cases, it is necessary to use a mobile X-ray system. For example, U.S. Pat. No. 6,702,459 to Barnes and Gauntt discloses an improved mobile X-ray imaging system (the contents and disclosure of the '459 patent are hereby fully and completely incorporated herein by this reference). Mobile X-ray systems play an important role in medical imaging, particularly when a subject is ill or cannot be transported easily. Mobile X-ray imaging (also known as portable radiography, mobile radiography and bedside radiography) is accomplished by moving the X-ray unit and image receptor to the subject. Many issues arise in mobile X-ray imaging, including without limitation, difficulties in obtaining optimal alignment of the X-ray beam, increased scatter associated with the images obtained using mobile radiography equipment and problems in positioning subjects to obtain the necessary images.

In tertiary care medical centers, mobile radiographic exams represent a significant percentage of the radiographic exams performed. As discussed above, X-ray scattering is a problem in radiography, particularly mobile radiography. The degrading effect of scatter can be reduced in radiography through the use of anti-scatter grids which decrease the amount of scatter incident on the image receptor. In one embodiment, an anti-scatter grid may include a laminate of lead foil strips interspersed with strips of radiolucent material (FIG. 1). Other types of anti-scatter grids are also known. For example, U.S. Pat. Nos. 6,625,253 and 6,795,529 to Barnes and Gauntt discloses improved anti-scatter grids (the contents and disclosure of the '253 and '529 patents are hereby fully and completely incorporated herein by this reference).

The grid is positioned between the object of interest and the image receptor and oriented such that the image forming primary X-rays are incident only with the edges of the lead foil strips. Thus, the majority of primary X-rays pass through the radiolucent spacer strips. In contrast, scattered X-rays are emitted in all directions after interaction with the object and as such, scattered X-rays are incident on a larger area of lead and only a small percentage of scattered X-rays are transmitted by the grid, as compared to primary X-rays. The degree of scatter control for a given grid depends upon the grid ratio, which is defined as the ratio of the radiopaque strip thickness in the direction of the X-ray path to the width of the radiolucent spacer material as measured orthogonal to the X-ray beam path. Thus, the higher the grid ratio, the greater the scatter control. A high grid ratio, while more effective, is also more difficult to align relative to a focal spot. In order to compensate for X-ray beam divergence a focused grid may be used. In a focused grid, the radiopaque strips are tilted to a greater extent with increasing distance from the center of the grid. The planes of the grid vanes all converge along a line known as the focal axis (illustrated in FIG. 2). The distance from the focal axis to the surface of the grid is referred to as the focal distance of the grid. When the focal spot is coincident with the focal axis of the grid, the primary X-rays have minimal interaction with the radiopaque lead strips and so maximal primary transmission and optimum image quality are obtained. Misalignment of the focal axis of the anti-scatter grid with the focal spot diminishes primary X-ray transmission while scattered X-ray transmission remains unchanged. This reduces the image contrast and thus the image quality. Thus, optimal image quality requires alignment of the focal spot with the focal axis of the anti-scatter grid.

In stationary X-ray systems, the image receptor, anti-scatter grid and X-ray tube are rigidly mounted and in a fixed position relative to one another, thereby making focal spot and grid alignment a simple process. In mobile radiography, however, an image receptor is placed under a bedridden subject and the X-ray source is positioned manually above the subject. Often, to avoid the difficulties in aligning the focal spot with the anti-scatter grid, a grid is not used and thus only a small fraction of the possible contrast is obtained in the X-ray image. As a result, scatter to primary X-ray ratios of 10:1 or more are common in chest and abdominal bedside radiography resulting in less than 10% of the possible image contrast being obtained in mobile radiographic films. Digital image receptors are more sensitive to scattered radiation than screen-film image receptors; therefore, scatter effects are exacerbated when digital image receptors are utilized.

In principle, the contrast in mobile radiography can be improved by using an anti-scatter grid. However, because the image receptor and anti-scatter grid must be positioned manually, it is extremely difficult to achieve proper alignment. When anti-scatter grids are utilized in conjunction with mobile radiography, the anti-scatter grid is typically not well aligned. Misalignment problems are diminished by utilizing an anti-scatter grid having a low ratio of 8:1 or less. With the use of a low ratio anti-scatter grid, X-ray image contrast is often improved compared to using no grid; however, the contrast remains significantly lower than otherwise could be obtained with a properly aligned, high ratio grid having a grid ratio of 10:1 or greater. Thus while mobile radiography is in many ways more convenient than fixed installation radiography its clinical utility is diminished due to the degradation of image quality caused by scattered radiation. Recent developments in aligning the anti-scatter grid with the focal point of the X-ray source in mobile radiography have been developed; one embodiment requires the attachment of a target arm on the side of the image receptor holder, the target arm comprising one or more components of an automatic position measurement system requiring line of sight communications with the mobile radiographic unit (U.S. Pat. No. 6,702,459 to Barnes and Gauntt). In alternate embodiment of U.S. Pat. No. 6,702,459, the image receptor holder comprises one or more components of an automatic position measurement system not requiring line of sight communications.

Most image receptors are rectangular. For some exams, the long axis of the image receptor is oriented parallel to the patient's spine, or craniocaudal axis (head-to-foot axis); this orientation is referred to as "lengthways". For other exams, the long axis is oriented perpendicular to the craniocaudal axis; this orientation is referred to as "crossways". The choice of orientation is made based on the exam to be done. For example, chest radiographs are typically done with 35 cm×43 cm cassettes in a crossways orientation, because the 35 cm dimension is long enough to see the full height of the region of interest, while it is very important to image the full width of the patient. In contrast, abdominal radiographs are typically done with the cassette in a lengthways orientation, because it is more important to image the full length of the abdomen and less important to obtain images of the periphery of the patient.

The greatest improvement in image contrast in the spine is achieved when the focal axis of the anti-scatter grid is approximately parallel with the craniocaudal axis (head-to-foot axis). A conventional grid tunnel may have the focal axis parallel to the craniocaudal axis for crossways radiographs, but will then have the focal axis perpendicular to the craniocaudal axis for lengthways radiographs. Thus, a single conventional grid tunnel cannot take optimal radiographs in both the lengthways and crossways orientations, no matter how accurately the focal spot is aligned with the focal axis.

Digital flat panel detectors are becoming increasingly commonly used as image receptors in bedside radiography. These detectors can transmit an image directly to a computer without being removed from under the patient. These detectors are sometimes equipped with low ratio, removable anti-scatter grids; such grids are known in the trade as grid caps. Some manufacturers provide square flat panel detectors. The transverse and longitudinal dimensions of a square image receptor are identical, so the terms "crossways" and "lengthways" are not relevant for these detectors. Such a detector equipped with a high ratio grid cap would provide optimal and flexible imaging for bedside radiography provided that the focal spot can be aligned with the grid focal axis. Barnes and Gauntt disclose a system to provide such alignment to a grid tunnel with a removable image receptor, but they do not explicitly describe alignment to digital flat panel image receptor with a removable grid cap. An additional concern is ease of use. Placing a 35 cm×43 cm cassette under a 300 pound unconscious patient is not an easy task. Roddy (U.S. Design Pat. D397,795) disclosed a cassette holder to simplify the tasks of placing the image receptor under the patient, and of removing the image receptor from under the patient. This is accomplished by placing handles along the short side of the cassette holder. When the cassette is oriented for a crossways radiograph, the handles are along the patient's side and thus easily accessible. However, when oriented for lengthways radiography, the handles are under the patient and do not aid in removing the image receptor. McNair (U.S. Design Pat. D546,453) discloses a grid tunnel with handles along one long and both short sides of the grid tunnel. This approach aids in handling for both lengthways and crossways orientation, but is bulkier than Roddy's design. Furthermore, it is impossible with McNair's design to acquire both crossways and lengthways radiographs with the grid focal axis parallel to the patient's craniocaudal axis.

A further concern is the thickness and stiffness of the cover of the image receptor assembly. Grid tunnels, film-screen and computed radiography cassettes, flat-panel digital image receptors, and similar image receptor assemblies, are all equipped with a cover that protects the interior of the assembly from the environment. For example, the interiors of film/screen cassettes and photodiode flat-panel digital image receptors needs to be protected from light, and all image receptor assemblies need to be protected from dust and mechanical injury. To provide maximum protection against mechanical injury it is preferable to use a thick cover; however, to minimize X-ray absorption and scattering (collectively, X-ray attenuation) it is preferable to use a thin cover.

Accordingly, there exists a need for a bi-directional image receptor assembly useful in radiography, particularly mobile radiography, that can accept rectangular image receptors in either a lengthways or crossways orientation while maintaining the proper anti-scatter grid alignment in respect to the subject's craniocaudal axis. There also is a need for a digital flat panel detector and associated grid cap that is compatible with the alignment system disclosed by Barnes and Gauntt, and a need for a protective cover that simultaneous provides low X-ray attenuation and high mechanical stiffness.

BRIEF DESCRIPTION OF DRAWINGS

It should be noted that identical features in different drawings are shown with the same reference numeral.

FIGS. 8 A-D illustrates one embodiment of a vaulted reinforcing geometry for use in a cover of the present disclosure. FIG. 8A shows a top view of a cover incorporating the vaulted reinforcing geometry. FIG. 8B shows a side perspective view of a cover incorporating the vaulted reinforcing geometry. FIG. 8C shows a cross sectional view of a cover incorporating the vaulted reinforcing geometry taken along line A-A of FIG. 8A. FIG. 8D shows a cross sectional view of a cover incorporating the vaulted reinforcing geometry taken along line B-B of FIG. 8A.

FIGS. 9 A-D illustrates one embodiment of a pyramidal reinforcing geometry for use in a cover of the present disclosure. FIG. 9A shows a top view of a cover incorporating the pyramidal reinforcing geometry. FIG. 9B shows a side perspective view of a cover incorporating the pyramidal reinforcing geometry. FIG. 9C shows a cross sectional view of a cover incorporating the pyramidal reinforcing geometry taken along line A-A of FIG. 9A. FIG. 9D shows a cross sectional view of a cover incorporating the pyramidal reinforcing geometry taken along line B-B of FIG. 9A.

FIGS. 10 A-D illustrates one embodiment of a truncated pyramidal reinforcing geometry for use in a cover of the present disclosure. FIG. 10A shows a top view of a cover incorporating the truncated pyramidal reinforcing geometry. FIG. 10B shows a side perspective view of a cover incorporating the truncated pyramidal reinforcing geometry. FIG. 10C shows a cross sectional view of a cover incorporating the truncated pyramidal reinforcing geometry taken along line A-A of FIG. 10A. FIG. 10D shows a cross sectional view of a cover incorporating the truncated pyramidal reinforcing geometry taken along line B-B of FIG. 10A.

FIGS. 11 A-D illustrates one embodiment of a domed reinforcing geometry for use in a cover of the present disclosure. FIG. 11A shows a top view of a cover incorporating the domed reinforcing geometry. FIG. 11B shows a side perspective view of a cover incorporating the domed reinforcing geometry. FIG. 11C shows a cross sectional view of a cover incorporating the domed reinforcing geometry taken along line A-A of FIG. 11A. FIG. 11D shows a cross sectional view of a cover incorporating the domed reinforcing geometry taken along line B-B of FIG. 11A.

FIGS. 12 A-D illustrates one embodiment of a ridged reinforcing geometry for use in a cover of the present disclosure.

DETAILED DESCRIPTION

The present disclosure provides a bi-directional image receptor assembly capable of receiving an image receptor in either a lengthways (or longitudinal) or crossways (or transverse) orientation, while maintaining the axis of an anti-scatter grid in a fixed position. The axis of the anti-scatter grid can be placed in a fixed orientation (such as a parallel orientation) to a subject's craniocaudal axis regardless of whether the image receptor is inserted in the lengthways or crossways orientation. Methods of using the bi-directional image receptor assembly in mobile radiography are also disclosed.

Therefore, it is one object of the present disclosure to provide a bi-directional image receptor assembly comprising an anti-scatter grid for receiving an image receptor, where the image receptor assembly is configured to receive the image receptor in either a crossways or lengthways orientation without changing the orientation of the anti-scatter grid, or while maintaining the axis of an anti-scatter grid in a fixed position. The bi-directional image receptor assembly may further comprise the image receptor.

It is another object of the present disclosure to provide a bi-directional image receptor assembly compatible with Barnes and Gauntt that simplifies radiographic procedures by ensuring the proper alignment of the anti-scatter grid with the patient's craniocaudal axis.

It is a further object of the present disclosure to provide a cover for an image receptor assembly, or for an image receptor for computed tomography (such as cone beam computed tomography), radiography or fluoroscopy, that provides maximum mechanical stiffness while minimizing the attenuation and scatter of X-rays passing through the cover.

Bi-Directional Image Receptor Assembly

One embodiment of the bi-directional image receptor assembly 10 is described below that accomplished the objects of the present disclosure. The foregoing describes only selected embodiments of the bi-directional image receptor assembly of the present disclosure. Other embodiments of the bi-directional image receptor can also be envisioned and are not excluded from the scope of the present disclosure.

Figure 4:
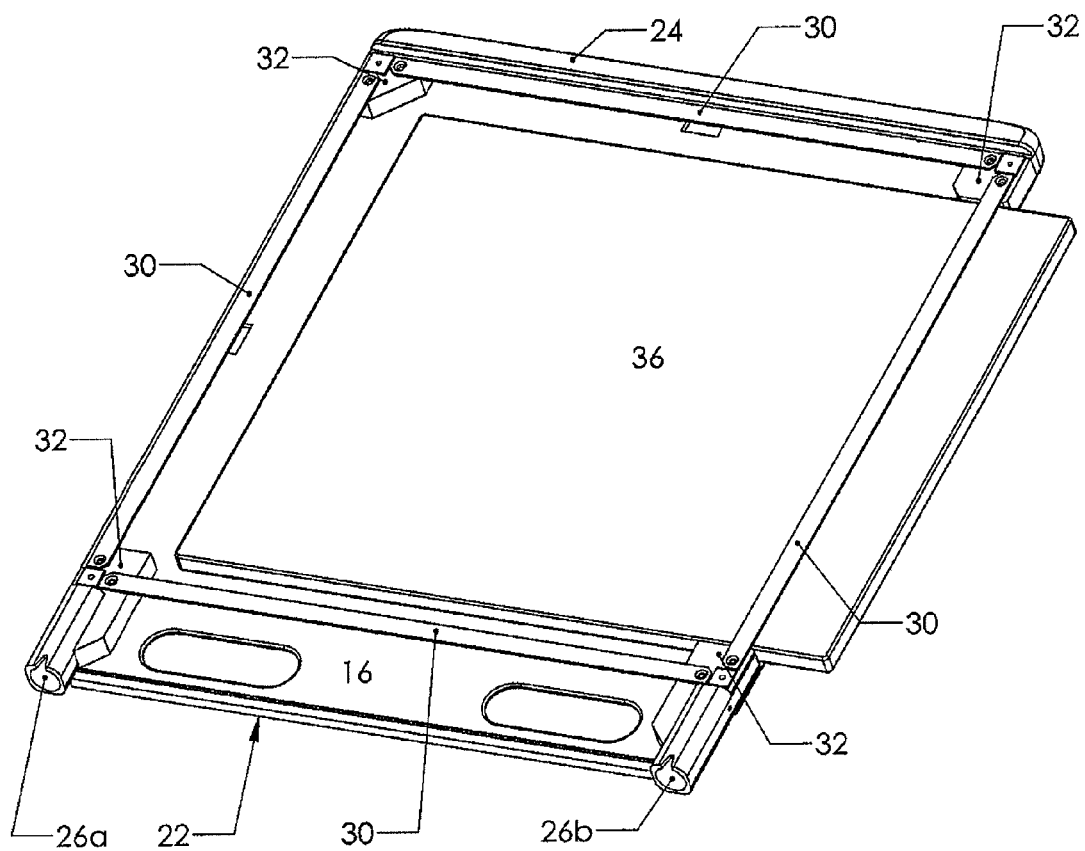
FIG. 4 shows a perspective view of the bi-directional image receptor assembly with the anti-scatter grid cover removed, and the cassette partially inserted in the lengthways orientation.
Figure 5:
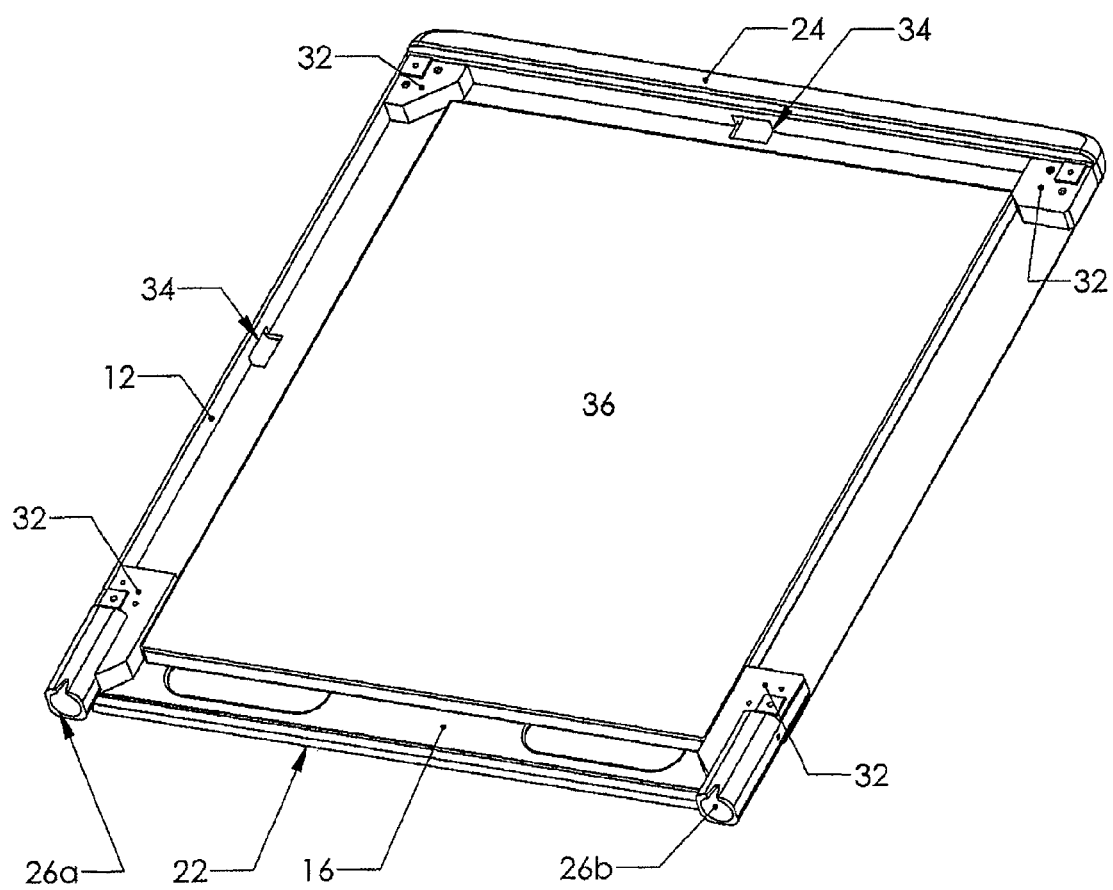
FIG. 5 shows a perspective view of the bi-directional image receptor assembly with the anti-scatter grid cover removed, and the cassette partially inserted in the crossways orientation.
Figure 6A:
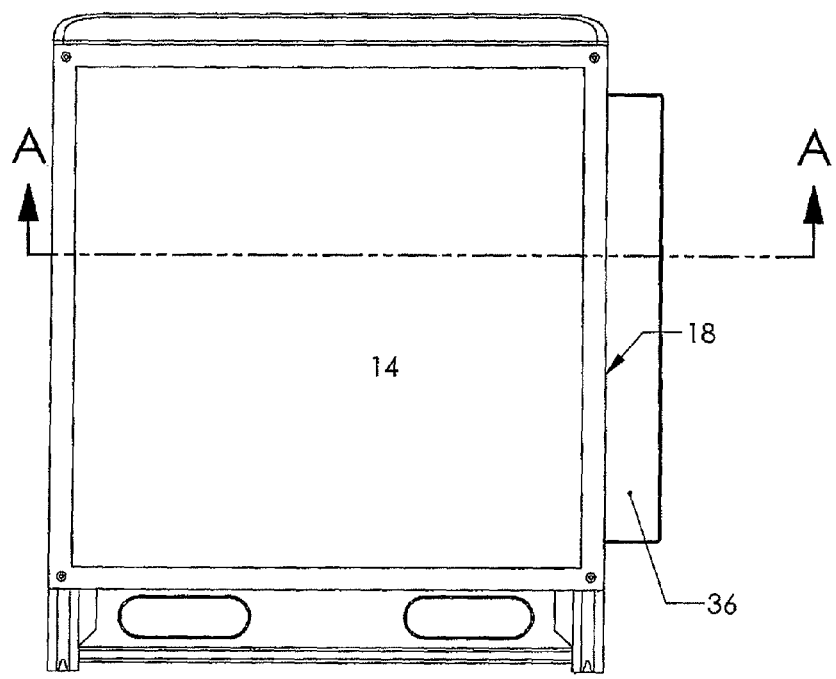
FIG. 6A shows an image receptor partially inserted into the bi-directional image receptor assembly in the lengthways orientation.
Figure 6B:
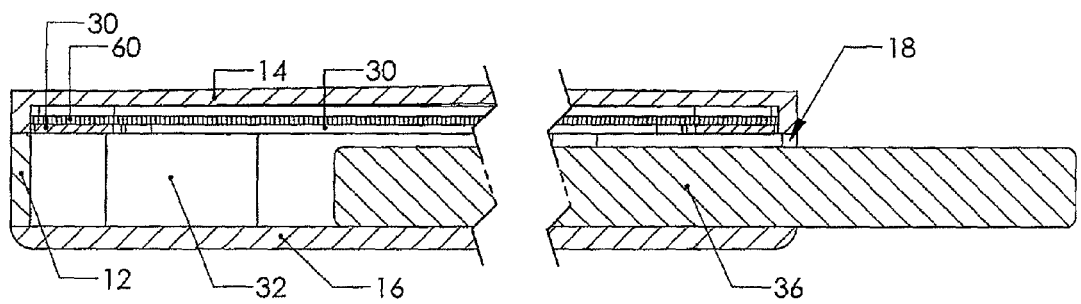
FIG. 6B shows a cross-sectional view of the bi-directional image receptor assembly taken along line A-A of FIG. 6A with image receptor partially inserted in the lengthways orientation.
Figure 7A:
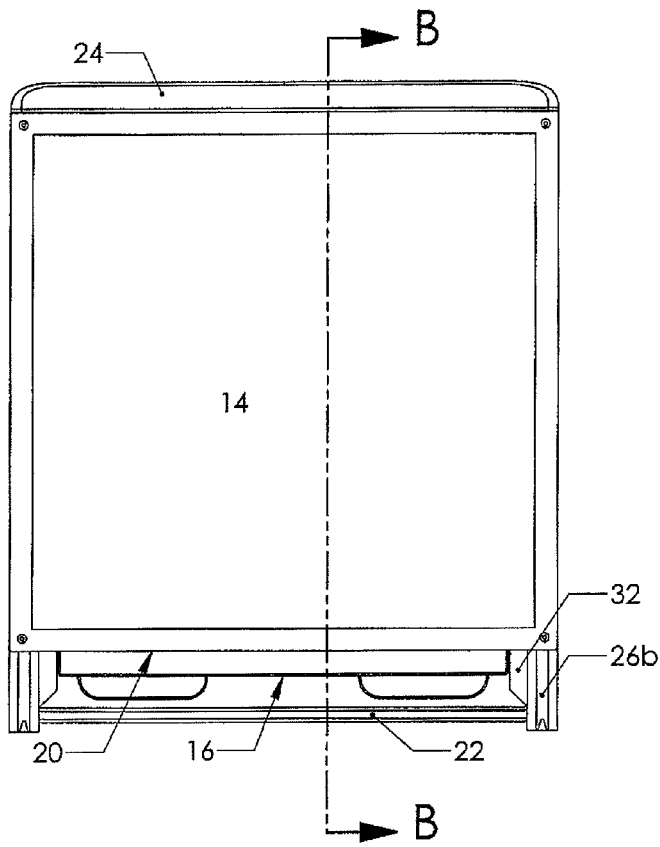
FIG. 7A shows an image receptor partially inserted into the bi-directional image receptor assembly in the crossways orientation.
Figure 7B:
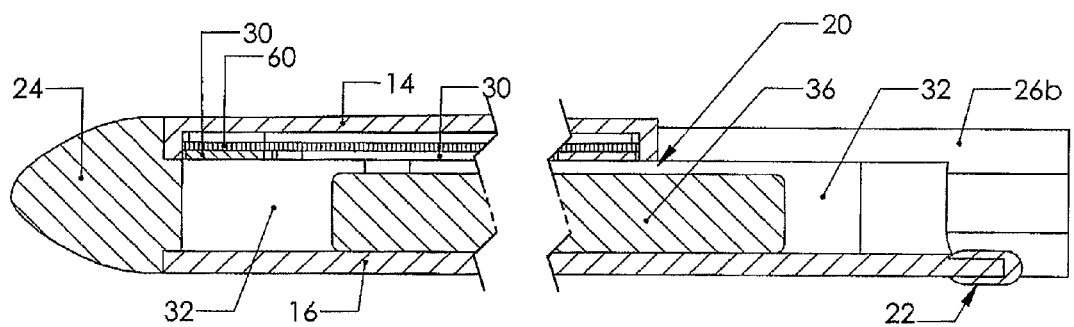
FIG. 7B shows a cross-sectional view of the bi-directional image receptor assembly taken along line B-B of FIG. 7A with an image receptor partially inserted in the crossways orientation.

Now referring to the figures in general and FIGS. 3A and 4-7 specifically, one embodiment of the bi-directional image receptor assembly 10 is shown comprising a side plate 12 (shown best in FIG. 5), a cover 14, a base plate 16, an end plate 24, a first opening 18, a second opening 20 and an anti-scatter grid (designated 60 as shown in FIGS. 6B and 7B). The bi-directional image receptor assembly 10 may further comprises at least one of the following elements: a handle 22 having at least one hand hold, shown in FIG. 3A as hand holds 23a and 23b, at least one target arm mount, shown in FIG. 3A as target arm mounts 26a and 26b, at least one spacer element 30, shown in FIGS. 4, 6, and 7, and a plurality of guide elements 32, shown in FIGS. 4-7 as corner blocks. The side plate 12, cover 14, base plate 16 and end plate 24 form a generally rectangular or square configuration with a hollow interior. First 18 and second 20 openings to receive an image receptor (designated 36 as shown in FIGS. 4-7) are provided to access the interior portion. In one embodiment, the cover 14 is manufactured from a radio-lucent material to allow imaging through the cover 14. In a specific embodiment, the cover 14 is manufactured from a low atomic number radio-lucent material. Exemplary materials include, but are not limited to, carbon fiber, polycarbonate (such as LEXAN™) and acrylic materials (such as LUCITE™).

Figure 1:
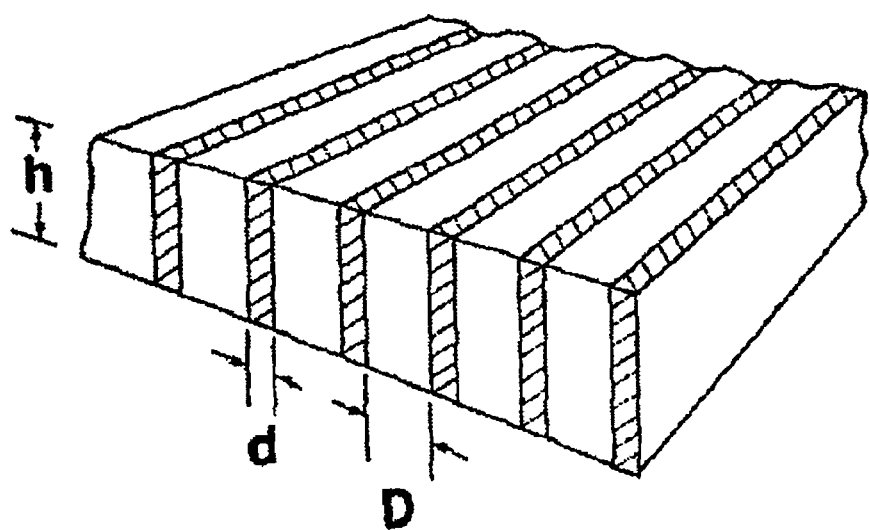
FIG. 1 shows a prior art anti-scattering grid common in the field.
Figure 2:
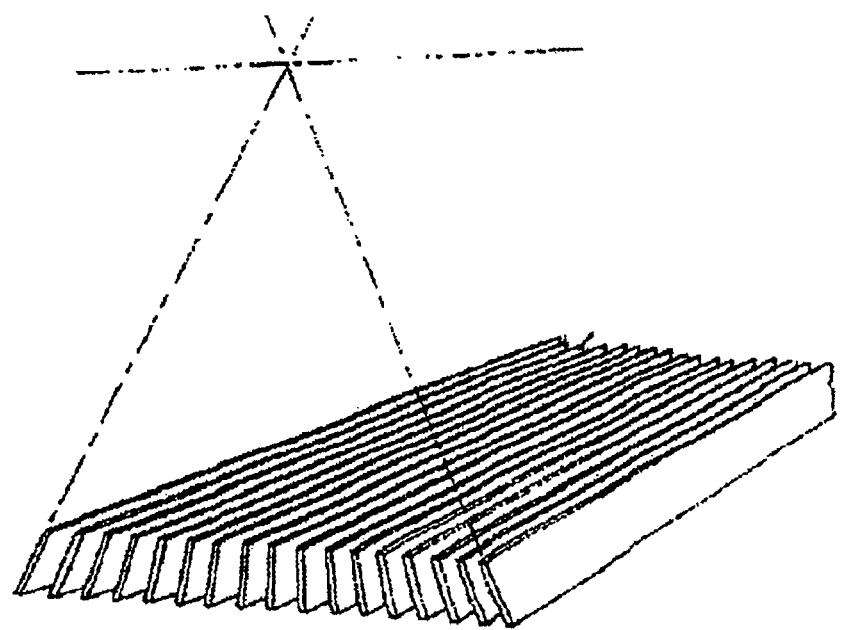
FIG. 2 shows a prior art focused anti-scattering grid common in the field.
Figure 3A:
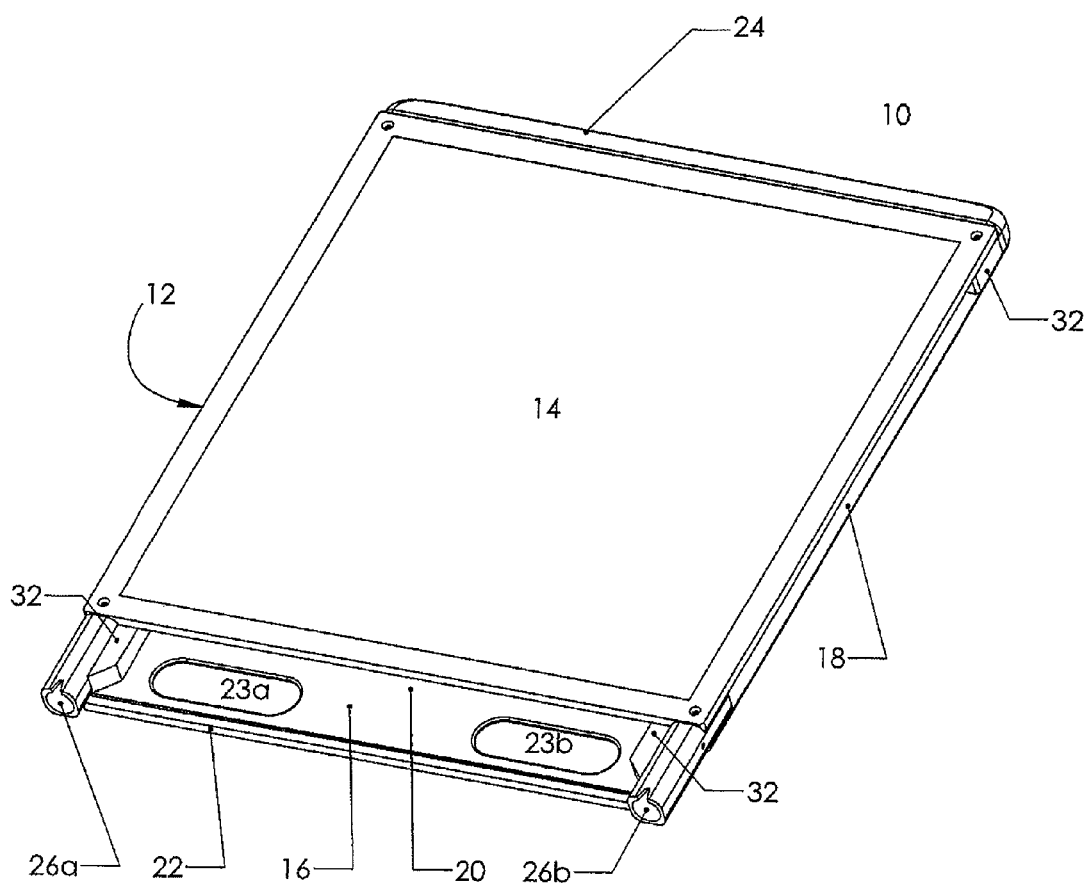
FIG. 3A shows a perspective view of one embodiment of the bi-directional image receptor assembly.
Figure 3B:
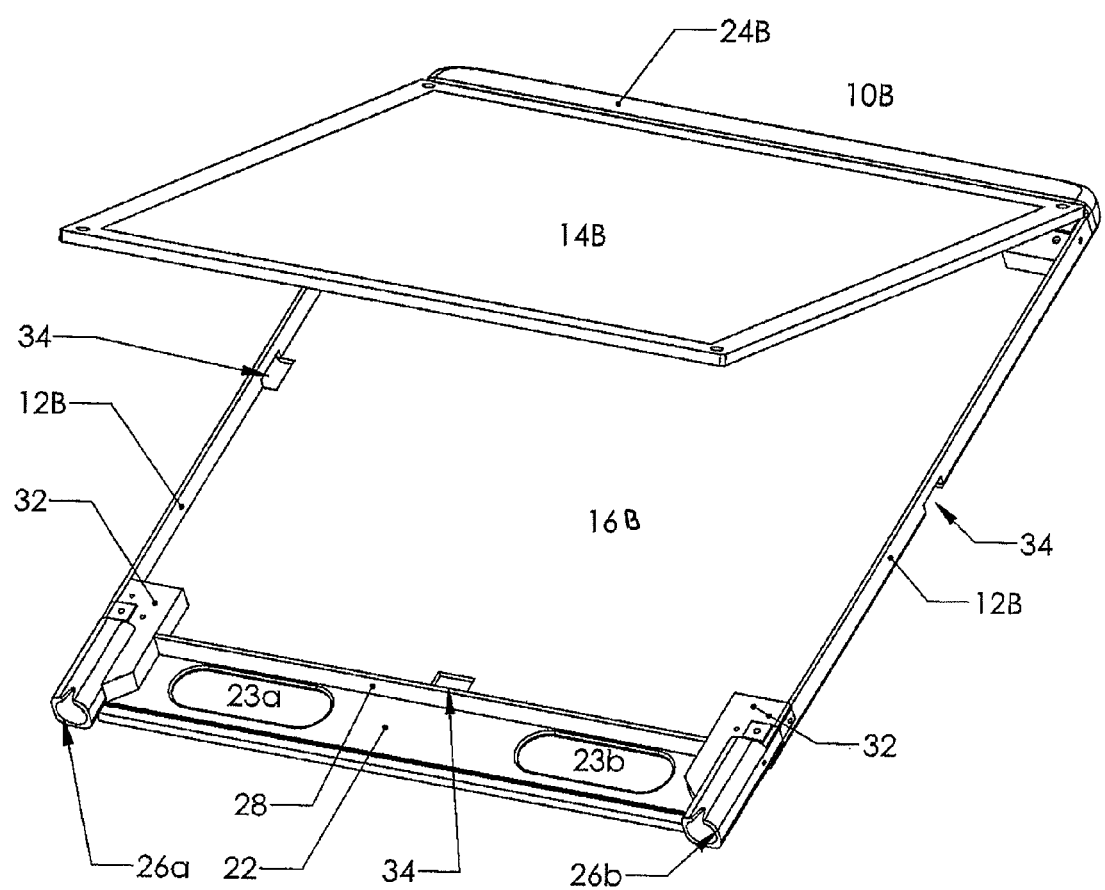
FIG. 3B shows a perspective view of one embodiment of the bi-directional image receptor assembly.

In an alternate embodiment shown in FIG. 3B, the bi-directional image receptor assembly 10B is shown comprising at least one side plate 12B, a cover 14B, an end plate 24B, a frontplate 28, a base plate 16B and an anti-scatter grid (designated 60 as shown in FIGS. 6B and 7B). In the embodiment shown in FIG. 3B, two side walls 12B, an endplate 24B, and a frontplate 28B are shown. In this embodiment, the bi-directional image receptor assembly 10 forms a completely closed structure with a hollow interior. The cover 14B and/or the base plate 16B are movably secured to a portion of the bi-directional image receptor assembly 10B (such side wall 12B or end plate 24B) in order to gain access to the interior portion. The cover 14B or base 16B may be movably secured by a hinge mechanism or may slidably engage portions of the bi-directional image receptor assembly 10B. The bi-directional image receptor assembly 10B may further comprise at least one of the following elements: a handle 22 having at least one hand hold, shown in FIG. 3B as hand holds 23a and 23b, at least one target arm mount, shown in FIG. 3B as target arm mounts 26a and 26b, at least one spacer element 30, shown in FIGS. 4 and 6-7, and a plurality of guide elements 32, shown in FIGS. 3-7 as corner blocks.

The description below is made with reference to the embodiment, shown in FIG. 3A. However, the description below is generally applicable to the embodiment shown in FIG. 3B as well.

In the embodiments described above, the second opening 20 and the first opening 18 are positioned orthogonal to one another, for reasons that will be discussed herein. Specifically, in FIG. 3A the second opening 20 is shown located on the same side of the bi-directional image receptor 10 as the handle 22 and hand holds 23a and 23b. An image receptor may be inserted into the second opening 20 if a wider (rather than longer) radiographic image is desired. The second opening 20 is positioned generally orthogonal to the first opening 18. An image receptor may be inserted into the first opening 18 if a longer (rather than wider) radiographic image is desired.

In one embodiment (for example see FIG. 3A), the bi-directional image receptor 10 includes two hand holds 23a and 23b located on the handle 22. The hand holds 23a and 23b assist a care giver in (i) positioning the bi-directional image receptor 10 underneath a subject before a mobile radiography procedure and/or (ii) removing the bi-directional image receptor 10 after the procedure is complete. In one embodiment, the end plate 24 may be rounded to assist a care giver in placing the bi-directional image receptor assembly 10 underneath a subject. In an alternate embodiment, a single hand hold may be provided. In an alternate embodiment, no hand hold is provided.

In another embodiment, the bi-directional image receptor 10 comprises at least one target arm mount 26. The at least one target arm mount serves to removably receive a target arm equipped with optical or ultrasound targets, or other components of an automatic position measurement system. The target arm allows the position and orientation of the image receptor to be determined by a mobile radiography system. An exemplary embodiment of a target arm assembly is described in U.S. Pat. No. 6,702,459 to Barnes and Gauntt (the teaching of which is hereby fully and completely incorporated herein by this reference). In FIG. 3, two target arm mounts, 26a and 26b, are provided and are located opposite one another and run along an axis parallel with the side plate 12 and perpendicular to the end plate 24. In one embodiment, the bi-directional image receptor assembly 10 is used in conjunction with the mobile radiography system disclosed in U.S. Pat. No. 6,702,459 to Barnes and Gauntt (the teaching of which is hereby fully and completely incorporated herein by this reference).

In one embodiment, the bi-directional image receptor assembly 10 comprises a portion of an automatic position sensing system not requiring a direct line of sight, such as one or more electromagnetic sensors or inertial navigation units.

In one embodiment, sensors in the image receptor assembly 10 detect the orientation (crossways or lengthways) of the image receptor 36. This information can be communicated to the mobile radiographic unit by electronic cable, radio signal, infrared signal, sonic signal, optical signal, or other means known in the art. The radiographic unit can then adjust the length and width of the radiation field to match the length and width of the image receptor. This function is similar to the Positive Beam Limitation required by the FDA for fixed radiographic systems (see 21CFR1020.31(g)). In one embodiment, the information is communicated directly to the mobile radiography unit by the image receptor assembly. In another embodiment, this information is conveyed via the target arm of Barnes and Gauntt which is connected to the image receptor assembly 10 at the target arm mount 26. The target arm may convey the information actively by such means as discussed above or passively. When passive communication is used, the target arm may present a distinct visual appearance when the image receptor is in the crossways or lengthways orientation. In one embodiment, the fiducial markers (as disclosed in U.S. Pat. No. 6,702,459 to Barnes and Gauntt, the teaching of which is hereby fully and completely incorporated herein by this reference) on the target arm may have a distinct appearance or orientation when the image receptor is in the crossways orientation versus the lengthways orientation. The advantage of communicating via the target arm is that the target arm extends out from under the patient, providing a direct line of site to the mobile radiographic unit and simplifying the transmission of the orientation information.

In one embodiment, the anti-scatter grid 60 is associated with the cover 14. The anti-scatter grid 60 may be permanently secured to the cover 14 or may be removably secured to the cover 14. The cover 14 may be attached to the anti-scatter grid 60 for example by screws, snaps, or other fastening means known to the art.

If the cover 14 if movably attached, it may be attached for example by a hinge or the cover 14 may slide into the container along one or more guides. In embodiments where the anti-scatter grid 60 is removably secured to the cover 14, the anti-scatter grid 60 may be retained by clips, screws, bolts, brackets, adhesives, receiving channels or by any other means known in the art. In embodiments where the anti-scatter grid 60 is permanently secured to the cover 14, the cover 14 may have an interior pocket formed therein to receive the anti-scatter grid 60. In certain embodiments, the anti-scatter grid 60 does not contact the image receptor 36. In these embodiments, the spacer elements 30 and/or guide elements 32 provide separation between the anti-scatter grid 60 and the image receptor 36. Spacer elements 30 of different thickness also allow for the use of anti-scatter grids of different thickness and the dimensions of the spacer elements 30 may be varied as required.

In certain embodiments, the cover 14 is constructed in such a manner to impart additional strength to the bi-directional image receptor 10. In these embodiments, the additional strength imparted to the cover 14 prevents damage to the image receptor 36, anti-scatter grid 60 and other components of the bi-directional image receptor 10 such as may be caused by the weight of a subject on the bi-directional image receptor 10 or by contacting the bi-directional image receptor 10 with other objects.

The guide elements 32 are shown in FIGS. 3-7. The guide elements serve to aid in the insertion of the image receptor into the first 18 and second openings 18 and aid in the proper positioning of the image receptor 36 in the bi-directional image receptor assembly 10. The guide elements 32 may be any structure that accomplished the aforementioned purpose. In the embodiment illustrated the guide elements 32 are shown as corner blocks. In this embodiment, the corner blocks are positioned at the interior corners of the bi-directional image receptor assembly 10. The corner blocks may have angled or rounded edges to aid in serving this purpose. In this manner, the guide elements also serve as structural reinforcement for the bi-directional image receptor assembly 10. The guide elements 32 may be designed to receive the at least one target arm mount, when present. In one embodiment, the guide elements 32 may all be identical in shape and dimension. In another embodiment, the shape and dimensions of the guide elements 32 may be determined individually. As shown in FIGS. 4 and 5, the guide elements 32 are configured differently to aid in the insertion and positioning of the image receptor 36 in the first 18 and second 20 openings. When inserted into the bi-directional image receptor assembly 10, the image receptor 36 will be held securely in place. As discussed herein, in certain embodiments, the guide elements 32 may also provide the function of the spacer element 30 and the spacer element 30 may be omitted.

In one embodiment, the bi-directional image receptor assembly 10 further comprises securing elements to prevent the image receptor 36 from sliding out of the assembly 10 while it is being transported to and placed under the patient. These may be clips, friction plates, or other devices known in the art.

In one embodiment, the bi-directional image receptor assembly 10 further comprises image receptor removal assistance openings. There may be any number of such openings as desired. In the embodiment shown in FIGS. 4 and 5 such openings are provided designated 34. The configuration (shape and size of the openings) may be varied as desired. The image receptor removal assistance openings are shown positioned in the base plate 16 and in the side wall 12 and end plate 24 but may be positioned as openings independently in the side wall 12 or end plate 24 or the base plate 16. The image receptor removal assistance openings 34 allow a force to be applied to an image receptor 36 previously inserted into the bi-directional image receptor assembly 10 to assist in removing the image receptor 36 from the bi-directional image receptor assembly 10. The radiographic media within the image receptor 36 may be processed by standard means.

FIG. 4 shows the bi-directional image receptor assembly 10 receiving a image receptor 36 in the lengthways orientation via first opening 18 while FIG. 5 shows the bi-directional image receptor assembly 10 receiving a image receptor 36 in the crossways orientation via second opening 20 (for illustration, the cover 14 has been omitted in FIGS. 4 and 5). FIG. 4 shows spacer elements 30. The spacer elements 30 may be continuous in nature and extend substantially along the perimeter of the bi-directional image receptor assembly 10 as shown in FIG. 4. Alternatively, the spacer elements may be present only on guide elements 32. In yet another alternate embodiment, the guide element 32 may be modified to provide the function of the spacer element 30 and spacer element 30 may be omitted. The image receptor 36 may be inserted into the bi-directional image receptor assembly's 10 first opening 18 or second opening 20 using a sliding motion, is guided into proper position by the guide elements 32 and is held securely in place after insertion. The image receptor 36 may be held in place by securing elements (not shown) as discussed above.

FIG. 6A shows the bi-directional image receptor assembly 10 receiving an image receptor 36 in the lengthways orientation via the first opening 18 with the cover 14 illustrated. FIG. 6B provides a cross sectional view (taken along line A-A of FIG. 6A) of the bi-directional image receptor assembly 10 and inserted image receptor 36. Importantly, the anti-scatter grid 60 is maintained along an axis parallel to the subject's craniocaudal axis whether the image receptor 36 is inserted in the first 18 or second 20 opening. With reference to FIG. 6B, the cross-sectional view shows the first opening 18 receiving the image receptor 36 and side wall 12 opposite the first opening 18. The side wall 12 joins the cover 14 and base plate 16. Spacer element 30 is shown in contact with a portion of the anti-scatter grid and providing spacing between the anti-scatter grid 60 and the image receptor 36. The image receptor 36 may be inserted into the bi-directional image receptor assembly's 10 first opening 18 through a horizontal or nearly horizontal sliding motion as guided by guide elements 32 (not shown in FIG. 6B) and may be held securely in place after insertion. The image receptor 36 may be held in place by securing elements (not shown) as discussed above.

FIG. 7A shows the bi-directional image receptor assembly 10 receiving an image receptor 36 in the crossways orientation via the second opening 20. FIG. 7B provides a cross sectional view (taken along line B-B of FIG. 7A) of the bi-directional image receptor assembly 10 and inserted image receptor 36. Importantly, the anti-scatter grid 60 is maintained along an axis parallel to the subject's craniocaudal axis whether the image receptor 36 is inserted in the first 18 or second 20 opening. With reference to FIG. 7B, the image receptor 36 is shown being inserted into the second opening 20. The cross-sectional view shows the second opening 20 receiving the image receptor 36 and end wall 24 opposite the second opening 20. The end wall 24 joins the cover 14 and base plate 16. The end wall 24 is shown with a rounded configuration as discussed above. Spacer element 30 is shown in contact with a portion of the anti-scatter grid and providing spacing between the anti-scatter grid 60 and the image receptor 36. The image receptor 36 may be inserted into the bi-directional image receptor assembly's 10 second opening 20 through a horizontal or nearly horizontal sliding motion as guided by guide elements 32 (not shown in FIG. 7B) and may be held securely in place after insertion.

The anti-scatter grid 60 is in a fixed position in the bi-directional image receptor assembly 10. As discussed herein, the anti-scatter grid may be removed in certain applications. However, when present the anti-scatter grid is in a fixed position in the image receptor assembly 10. The anti-scatter grid is placed in the bi-directional image receptor assembly 10 such that when the assembly 10 has been placed under the patient from the side, the axis of the anti-scatter grid is generally parallel to the subject's craniocaudal axis. In this embodiment, anti-scatter grid 60 is positioned such that the axis of the anti-scatter grid 60 is generally parallel to the line A-A in FIG. 6A and generally orthogonal to the line B-B in FIG. 7A. With such placement, when the assembly has been placed under the patient from the side the axis of the anti-scatter grid is always generally parallel with the craniocaudal axis of the subject regardless of whether the image receptor 36 is inserted into the first 18 or second 20 opening. The ratio of the anti-scatter grid may be chosen by the operator/manufacturer and is not critical to the present disclosure.

The bi-directional image receptor assembly may be designed to receive an image receptor of any size/shape desired. In one embodiment, the bi-directional image receptor assembly 10 may receive an image receptor 36 with dimensions of about 35 cm×43 cm in either a lengthways or crossways orientation. In another embodiment, the bi-directional image receptor assembly 10 may receive an image receptor 36 with dimensions of about 30 cm×35 cm in either a lengthways or crossways orientation. In yet another embodiment, the bi-directional image receptor assembly 10 may receive an image receptor 36 with dimensions of about 24 cm×30 cm in either a lengthways or crossways orientation. The bi-directional image receptor assembly 10 is not limited to receiving image receptors of the dimensions listed above, the foregoing are examples only. The dimensions of the side wall 12, base plate 24 and base 16, as well as other elements, may be adjusted to conform the bi-directional image receptor assembly 10 to appropriate dimensions to receive such image receptors. Furthermore, the size placement and/or configuration of the guide elements may also be adjusted to conform the bi-directional image receptor assembly 10 to appropriate dimensions to receive such image receptors.

In alternate embodiments, the anti-scatter grid 60 may be removable from the bi-directional image receptor assembly 10. In embodiments where the anti-scatter grid 60 is removed from the bi-directional image receptor assembly 10, the bi-directional image receptor assembly 10 may be used in procedures where it is preferable not to use an anti-scatter grid 60. In such embodiments, the cover 14 may be removable from the bi-directional image receptor assembly 10. For example, the cover 14 may be secured to the bi-directional image receptor assembly 10 using screws or similar devices. In this instance the screws may be removed, the cover lifted and the anti-scatter grid removed. In an alternate embodiment, the cover 14 is hingedly connected to the bi-directional image receptor assembly 10 (such as but not limited to at the connection to side wall 12) allowing the cover to be opened for removal of the anti-scatter grid 60.

The paragraphs below describe the use of the bi-directional image receptor assembly 10 in the context of mobile radiography. The description below is illustrative in nature. Generally, if a care giver wishes to utilize a mobile radiography system to obtain an X-ray image of a subject, the care giver will position the mobile radiography device into a rough alignment position. The care giver will also prepare the bi-directional image receptor assembly 10 for the procedure. First, the care giver inserts an image receptor 36 into the bi-directional image receptor assembly 10 as described above in either a lengthways or crossways orientation. If the care giver desires to obtain a longer (rather than wider) X-ray image, the image receptor 36 may be inserted into the first opening 18. Alternatively, if a caregiver wishes to obtain a wider (rather than longer) X-ray image the image receptor 36 may be inserted into the second opening 20. The bi-directional image receptor 10 is then placed underneath the patient from the patient's side using the handle 22. When used, the axis of the anti-scatter grid is always substantially parallel to the to the subject's craniocaudal axis.

The bi-directional image receptor assembly 10 enclosing the image receptor 36 is then inserted underneath the area to be X-rayed (such as the lumbar spine, chest or abdomen). The care giver then inserts the target arm (not shown) supplied with the mobile radiography system into one of the target arm mounts 26a or 26b to aid in positioning the mobile radiography system into the correct position for imaging according to the manufacturer's instructions. In one embodiment, the bi-directional image receptor assembly 10 is used in conjunction with the mobile radiography system disclosed in U.S. Pat. No. 6,702,459 to Barnes and Gauntt (the relevant teachings of which are hereby fully and completely incorporated herein by this reference). The bi-directional image receptor assembly 10 may also be used with different mobile radiography systems and different automatic position measurement systems however. After placement of the bi-directional image receptor assembly 10 and alignment of the mobile radiography system, an X-ray image is obtained. The care giver then removes the bi-directional image receptor assembly 10 from underneath the patient and removes the image receptor 36 from the bi-directional image receptor assembly 10. The image receptor 36 is processed as is known in the art.

In one embodiment, the image receptor 36 may be removed from the bi-directional image receptor assembly 10 through the use of the image receptor removal assistance openings 34 shown in FIG. 5.

In one embodiment, a square image receptor may be permanently mounted in the image receptor assembly, with a portion of a position measurement system fixedly attached to the image receptor. An anti-scatter grid incorporated into the assembly may be removed for examinations such as extremities and infants where the anti-scatter grid is not necessary; such an anti-scatter grid is known in the trade as a grid cap.

In one such embodiment, the cover 14 employs a reinforcing geometry to provide mechanical structure and stiffness with minimal material thickness. Minimal material thickness is important in order to reduce interaction of the X-rays with the cover 14. The reinforcing geometry may be symmetrical or asymmetrical. Exemplary reinforcing geometries are provided in FIGS. 8-12.

The cover 14 should be as thin as possible to minimize X-ray absorption and scatter in the cover. The use of a reinforcing geometry increases the cover stiffness for a given thickness, and therefore provides greater protection. Alternately, the use of a reinforcing geometry allows the use of a thinner cover for a given stiffness, thus reducing X-ray absorption and scatter and therefore improving image quality. To attain similar strength and rigidity without the incorporated reinforcing geometry, the cover 14 could be required to be 2-4 times thicker, requiring an increased patient radiation dose and reducing image quality. In certain embodiments of the cover of the present disclosure incorporating a reinforcing geometric shape, the cover 14 is from 0.5 mm to 3.0 mm in thickness. The thickness of the cover 14 may be uniform over the entirety of the cover 14, or certain portions of the cover 14 may incorporate different thickness.

The present disclosure provides a cover of minimal material thickness that is resistant to mechanical stress due to the presence of a reinforcing geometry in the cover. The reinforcing geometry provides enhanced resistance to mechanical stress while allowing the cover to be manufactured with minimal material thickness. The cover solves a long-felt but unmet need in the art for a means to protect objects from mechanical stress using a cover that is sufficiently light and thin for example in portable radiographic applications, which require equipment that is light and produces less attenuation of radiation. It is appreciated that the advantage of using a reinforcing geometry to increase the stiffness of the cover is not restricted to image receptor assemblies with removable image receptors. For example, such a shape would be useful for the cover of a flat-panel digital image detector. The same properties are advantageous in numerous other X-ray imaging applications, including industrial component imaging systems, agricultural imaging, and baggage screening, and other applications in which a heavy object is required to be supported by a cover without the cover deforming as a result of applied mechanical stress.

The cover is placed between an object to be protected from mechanical stress and a source of mechanical stress. The source of mechanical stress is said to be "outside" the cover, and the object to be protected is said to be "inside" the cover, although these directions need not correspond to an actual enclosure. The cover comprises a surface having a front side and a back side, an interior portion and a peripheral portion. Generally, the front side faces the outside and the back side faces the inside; the interior portion is the large central area through which x-ray beams pass; and the peripheral portion surrounds the interior portion and is where the cover is attached to the grid tunnel or image receptor. The reinforcing geometry redirects mechanical stress from the interior portion of the cover to the peripheral portion. The peripheral portion may be constructed from material having a different thickness than the interior portion.

The cover employs a reinforcing geometry to provide mechanical structure and stiffness with minimal material thickness. As explained above, in radiographic applications, minimal thickness is useful in order to reduce interaction of the radiation with the cover.

A number of reinforcing geometries may be incorporated into the cover as disclosed herein. FIGS. 8-12 provide several non-limiting examples of exemplary reinforcing geometries. In FIGS. 8-12, heights and thicknesses have been exaggerated for clarity of illustration.

Some embodiments of the cover comprise a vaulted reinforcing geometry, as illustrated in FIGS. 8A-D. FIGS. 8A-B show a top view and a side perspective view of the vaulted reinforcing geometry. Cross sectional views along lines A-A and B-B of one embodiment of the vaulted reinforcing geometry are provided in FIGS. 8C-D.

Some embodiments of the cover comprise a pyramidal reinforcing geometry, as illustrated in FIGS. 9A-D. FIGS. 9A-B show a top view and a side perspective view of the pyramidal reinforcing geometry. The pyramid may have a base of any shape, including a triangle, quadrilateral (including a rectangle and a square), a pentagon, a hexagon, or a polygon of any type that suits the specific application. A pyramid having a square or rectangular base is suitable for many applications. Cross sectional views along lines A-A and B-B of one embodiment of the pyramidal reinforcing geometry are provided in FIGS. 9C-D.

Some embodiments of the cover comprise a truncated pyramidal reinforcing geometry, as illustrated in FIGS. 10A-D. FIGS. 10A-B show a top view and a side perspective view of the truncated pyramidal reinforcing geometry. The truncated pyramidal reinforcing geometry is similar to the pyramidal reinforcing geometry, but further comprises a substantially flat truncation that replaces the apex of the pyramid. The truncation may be substantially parallel to the plane of the base of the truncated pyramidal reinforcing geometry, or it may be inclined relative to the plane of the base of the truncated pyramidal reinforcing geometry. A truncation substantially parallel to the plane of the base has the advantage of providing level support to any structures or objects that may rest on the cover. Cross sectional views along lines A-A and B-B of one embodiment of the truncated pyramidal reinforcing geometry are provided in FIGS. 10C-D.

Some embodiments of the cover comprise a domed reinforcing geometry, as illustrated in FIGS. 11A-D. FIGS. 11A-B show a top view and a side perspective view of the domed reinforcing geometry. The dome is or approximates a spherical dome, a spheroidal dome, or an ellipsoid dome. The dome may comprise an irregularity, such as a bulge, furrow, or plateau. A domed geometry has the advantage of having no edges that could damage surrounding structures or that could concentrate mechanical stress. Cross sectional views along lines A-A and B-B of one embodiment of the domed reinforcing geometry are provided in FIGS. 11C-D.

Figure 12A:
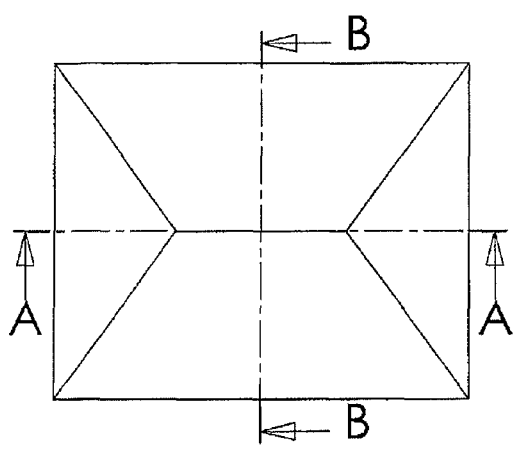
FIG. 12A shows a top view of a cover incorporating the ridged reinforcing geometry.
Figure 12B:
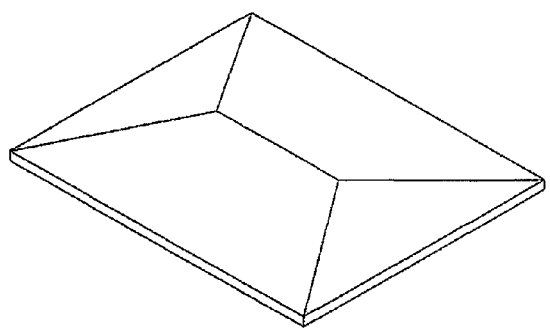
FIG. 12B shows a side perspective view of a cover incorporating the ridged reinforcing geometry.
Figure 12C:
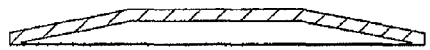
FIG. 12C shows a cross sectional view of a cover incorporating the ridged reinforcing geometry taken along line A-A of FIG. 12A.
Figure 12D:
FIG. 12D shows a cross sectional view of a cover incorporating the ridged reinforcing geometry taken along line B-B of FIG. 12A.

Some embodiments of the cover comprise a ridged reinforcing geometry, as illustrated in FIGS. 12A-D. FIGS. 12A-B show a top view and a side perspective view of the ridged reinforcing geometry. The ridge may be triangular in at least one cross-sectional plane. In some embodiments, the ridge is triangular in one cross-sectional plane and trapezoidal in a perpendicular cross-sectional plane. Such embodiments may, for example, may have two triangular faces and two trapezoidal faces, resembling the hip roof of a rectangular house. Cross sectional views along lines A-A and B-B of one embodiment of the ridged reinforcing geometry are provided in FIGS. 12C-D.

It is to be understood that some reinforcing geometries contemplated herein could be considered to be of more than one class described above. It is to be further understood that the cover may comprise a combination of multiple reinforcing geometries; for example, a truncated pyramid with a domed geometry at the apex.

The interior of the cover may be constructed from any suitable material that is capable of withstanding the expected mechanical stress and is largely radiolucent (i.e. translucent to X-rays). For some applications, suitable materials include polymers, carbon fiber composites, and low atomic number metals such as beryllium, aluminum, and titanium.

The periphery of the cover may be constructed from any suitable material that is capable of withstanding the expected mechanical stress. The periphery may be constructed from any material disclosed as suitable for the interior. Additionally, for some applications the periphery may be thicker and need not be radiolucent. In such applications a wider variety of materials may be used.

The cover comprising a reinforcing geometrical shape may function as an x-ray grid cover, an x-ray image receptor cover, a patient imaging support plate, or a surface for a surgical platform to allow imaging through said platform. Other applications are contemplated as well.

The foregoing description illustrates and describes the methods and other teachings of the present disclosure. Additionally, the disclosure shows and describes only certain embodiments of the methods and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain best modes known of practicing the methods and other teachings of the present disclosure and to enable others skilled in the art to utilize the teachings of the present disclosure in such, or other, embodiments and with the various modifications required by the particular applications or uses. Accordingly, the methods and other teachings of the present disclosure are not intended to limit the exact embodiments and examples disclosed herein. All references cited herein are incorporated by reference as if fully set forth in this disclosure.

What is claimed is:

1. An image receptor assembly for mobile radiography comprising an anti-scatter grid, the anti-scatter grid having a focal axis, where the image receptor assembly is configured to receive a rectangular image receptor in either a crossways or lengthways orientation without changing the orientation of the anti-scatter grid, wherein the focal axis of the anti-scatter grid is maintained in a fixed orientation relative to a subject's craniocaudal axis when placed under the subject regardless of the orientation of the image receptor.

2. The image receptor assembly of claim 1 wherein the image receptor has the dimensions of about 35 cm×43 cm, of about 30 cm×35 cm or of about 24 cm×30 cm.

3. The image receptor assembly of claim 1 wherein the anti-scatter grid is removable from said assembly.

4. The image receptor assembly of claim 1 wherein the anti-scatter grid is not removable from said assembly.

5. The image receptor assembly of claim 1 wherein the anti-scatter grid has a grid ratio of greater than 6:1.

6. The image receptor assembly of claim 1 where the image receptor is a digital flat panel detector, a computed radiography cassette, or a film screen cassette.

7. The image receptor assembly of claim 1 where the assembly further comprises a handle to facilitate insertion, removal or both insertion and removal of the assembly under a subject.

8. The assembly of claim 1 where the image receptor assembly further comprises a portion of an automatic position measurement system.

9. The image receptor assembly of claim 8 where the portion of the automatic position measurement system is a mount for a target arm.

10. The image receptor assembly of claim 8 where the portion of the automatic position measurement system is a sensor not requiring line of sight communication.

11. The image receptor assembly of claim 8 where the portion of the automatic position measurement system is a mount for an articulated arm.

12. The image receptor assembly of claim 1 further comprising a base plate, a cover, at least one side wall, an end plate, a first opening and a second opening, the first and second openings being generally orthogonal to one another and receiving the image receptor in either a crossways or lengthways orientation.

13. The image receptor assembly of claim 12 further comprising at least one of a spacer element and a guide element.

14. The image receptor assembly of claim 12 wherein the cover comprises a reinforcing geometry that renders the cover stiffer than a flat cover of the same thickness and material.

15. The image receptor assembly of claim 14 wherein the reinforcing geometry is one of the following group: ridged, domed, vaulted, or pyramidal.

16. The image receptor assembly of claim 14 wherein the reinforcing geometry is a combination of two or more shapes from the following group: ridged, domed, vaulted, pyramidal, truncated pyramidal.

17. The image receptor assembly of claim 14 wherein the reinforcing geometry is truncated pyramidal, wherein the area of the flat portion of the truncated pyramid that is parallel to the image receptor is smaller than the area of the image receptor.

18. The image receptor assembly of claim 1 further comprising a base plate, a cover, two side walls, and two end plates, at least one of said cover or base plate being movably attached to the image receptor assembly.

19. The image receptor assembly of claim 18 further comprising at least one of a spacer element and a guide element.

20. The image receptor assembly of claim 18 wherein the cover comprises a reinforcing geometry that renders the cover stiffer than a flat cover of the same thickness and material.

21. The image receptor assembly of claim 20 wherein the reinforcing geometry is at least one of the following group: ridged, domed, vaulted, or pyramidal.

22. The image receptor assembly of claim 20 wherein the reinforcing geometry is truncated pyramidal, wherein the area of the flat portion of the truncated pyramid that is parallel to the image receptor is smaller than the area of the image receptor.

23. An image receptor assembly for use with a mobile radiography system, the image receptor assembly comprising a digital image detector and a portion of an automatic position measurement system fixedly mounted to the image receptor, the automatic position measurement system determining the position and orientation of the image receptor to be determined by the mobile radiography system.

24. The image receptor assembly of claim 23 where the image receptor is substantially square.

25. The image receptor assembly of claim 23 where the assembly further comprises a handle to facilitate insertion, removal or both insertion and removal of the assembly under a subject.

26. The image receptor assembly of claim 23 where the portion of the automatic measurement system is a mount for a target arm.

27. The image receptor assembly of claim 23 where the portion of the automatic position measurement system is a sensor not requiring line of sight communication.

28. The image receptor assembly of claim 23 where the portion of the automatic measurement system is a mount for an articulated arm.

* * * * *